June 10, 1952

H. PENNINGTON, JR 2,600,261

AERIAL-MAP-PROJECTION-METHOD AND
APPARATUS FOR MAKING SAME

Filed Aug. 17, 1946

HARRY PENNINGTON JR.
INVENTOR.

BY J. Vincent Martin
Ralph R Browning
James B. Simms

ATTORNEYS

June 10, 1952
H. PENNINGTON, JR
AERIAL-MAP-PROJECTION-METHOD AND
APPARATUS FOR MAKING SAME
2,600,261
Filed Aug. 17, 1946
3 Sheets-Sheet 3
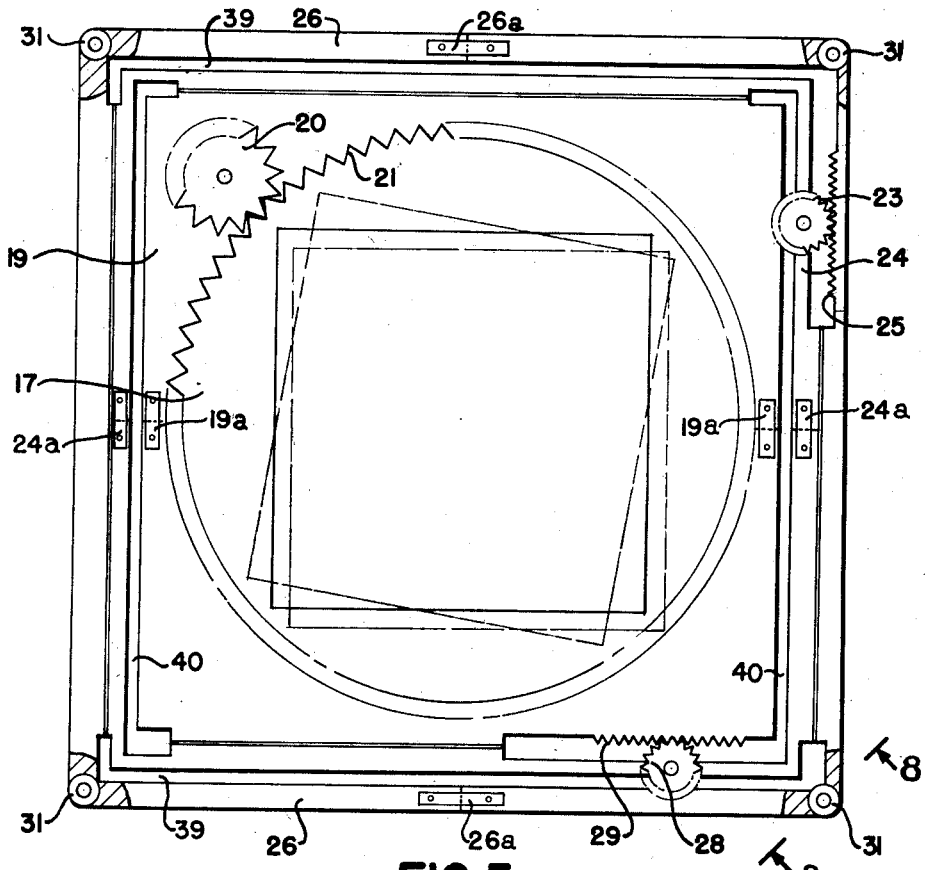
FIG. 5
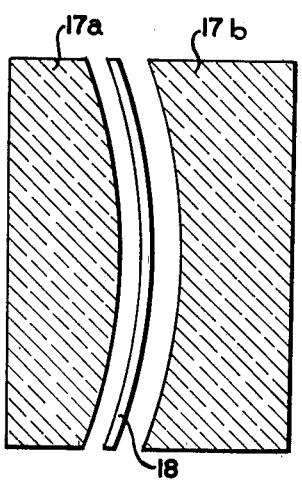
FIG. 6
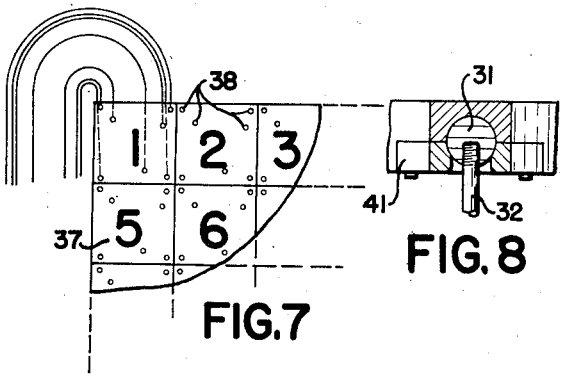
FIG. 7
FIG. 8
HARRY PENNINGTON JR.
INVENTOR.
BY J. Vincent Martin
Ralph R. Browning
James B. Simms
ATTORNEYS Patented June 10, 1952

2,600,261

UNITED STATES PATENT OFFICE 2,600,261

AERIAL MAP PROJECTION METHOD AND APPARATUS FOR MAKING SAME

Harry Pennington, Jr., San Antonio, Tex.

Application August 17, 1946, Serial No. 691,218

17 Claims. (Cl. 88—24)

This invention relates to improvements in aerial maps and refers more particularly to a method and apparatus for assembling aerial photographs into a mosaic map and the resulting product.

In making an aerial mosaic map, several series of pictures are taken from the air in overlapping relationship of an area to be mapped. In other words, each photograph includes a greater area than it will represent in the finished mosaic. The practice heretofore has been to assemble prints of the individual photographs into a mosaic map by manually tearing off the overlapping portion of adjacent prints and assembling the altered prints into the mosaic map. In obtaining the photo negatives, an effort is made to shoot each picture from substantially equal height above the mean surface of the earth included within the individual picture. In addition, an attempt is made to shoot each picture along an exact vertical line. However, in spite of the effort made along these lines, complete success in this respect is not usually obtained. Thus, when prints of the pictures are made and are to be compiled into a mosaic map, discrepancies exist in the prints so that the pictures may not be readily assembled into a composite map.

To facilitate assembly of the individual pictures into a map so that the map may be made to a substantially accurate scale, certain land marks such as schools, hills, barns or the like are first surveyed so the reproductions of these land marks may be placed in their proper relative position in the finished map. However, due to the above mentioned discrepancies in the prints the reference land marks can not be utilized to a large extent and still permit a harmonious blending of the component prints. In addition, these land marks must have substantial size to be readily distinguishable in the prints made from the individual negatives. Definite marks of previously known locations such as bench marks or the like often can not be utilized due to the obscurity of these marks.

In the past, an extremely large number of man-hours have been required to complete an aerial mosaic map after the pictures have been flown. Even when the map is completed, certain inaccuracies as to the scale of the map are inherent and under conventional methods, can not be entirely eliminated. Also, composite maps in natural color have never been made due to the additional time and expense required by the use of color films and prints. This may be readily appreciated when it is recalled that approximately one and one-half hours to twelve hours are required to develop each color print and often three hundred prints or more are used in compiling one mosaic map. In contrast, black and white prints may usually be completed in a few minutes.

An object of this invention is to provide a method and apparatus for making an aerial mosaic map truly representing the portion of the earth's area mapped.

Another object is to provide a method and apparatus for mechanically assembling aerial photographs into a mosaic map.

A further object is to provide an aerial mosaic map in natural color.

Still another object is to provide an aerial mosaic map true to scale.

A still further object is to provide a method and apparatus for correcting or compensating for inaccuracies and discrepancies inherent in aerial photographs in compiling an aerial mosaic map.

Yet another object is to provide a method and apparatus for taking aerial photographs of an area in which reference marks such as bench marks are represented in the film negatives.

Yet a further object is to provide a method and apparatus for preparing aerial mosaic maps in which the overlap of adjacent reproductions are absorbed upon light absorbent diaphragms or walls.

Another object is to provide a method for preparing mosaic maps from aerial photographs having uniform natural color characteristics.

Other and further objects of this invention will be apparent from the following description:

In the accompanying drawings which form a part of the instant specification and are to be read in conjunction therewith and wherein like reference numerals are employed to indicate like parts in the various views:

Fig. 5 is an enlarged vertical front elevation partially in section of the negative holder shown in the projector of Fig. 1;

Fig. 6 is an exploded section view of a correction element adapted for use in conjunction with this invention;

Fig. 7 is a face view of a control panel constituting a part of this invention;

Fig. 8 is a view taken along the line 8—8 in Fig. 5 in the direction of the arrows.

Figure 1:
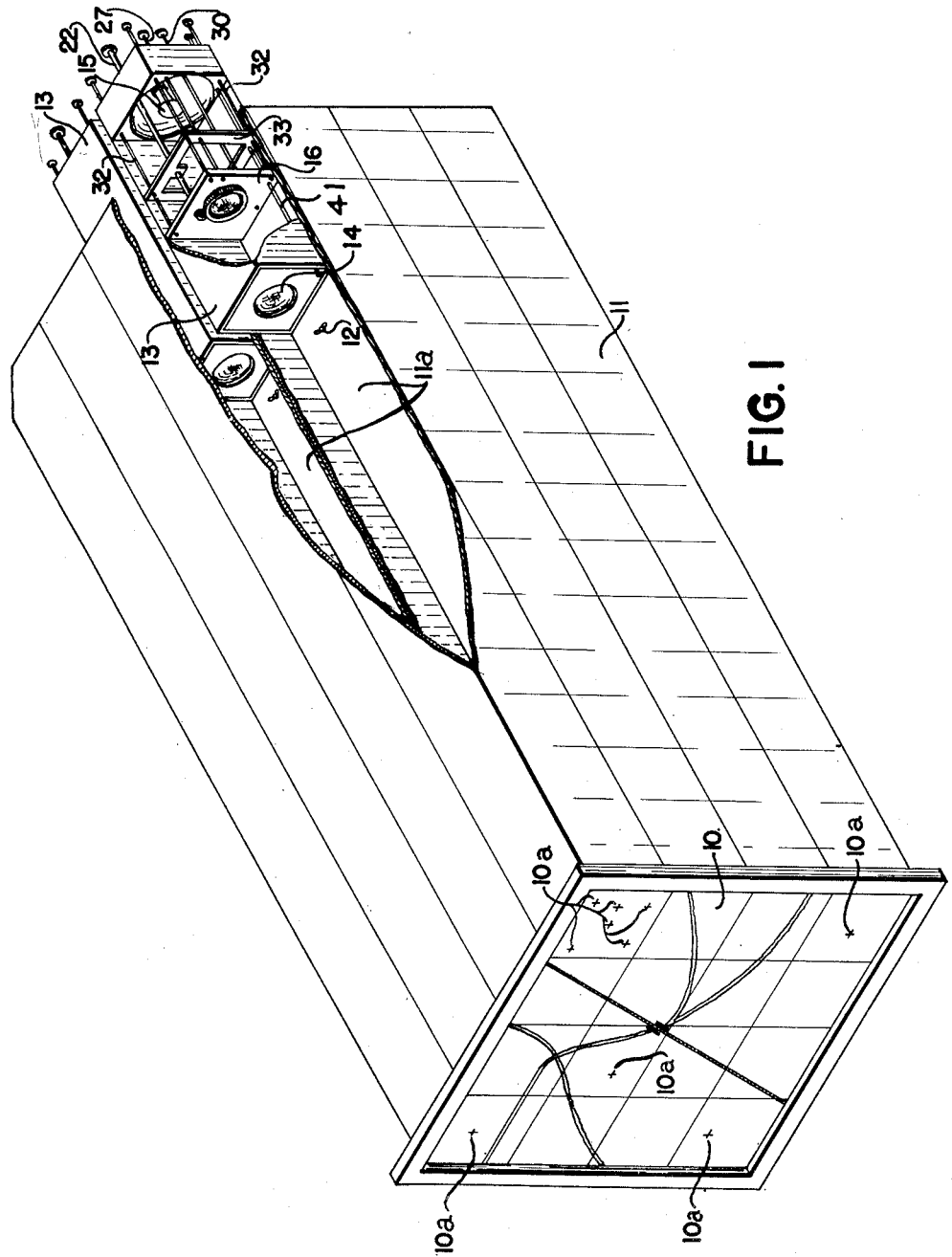
Fig. 1 is a diagrammatic isometric view of apparatus embodying this invention, with parts broken away for clarity.

Referring to the drawings, the invention will be described in conjunction with the schematic illustration of Fig. 1, in the interest of simplicity.

The aerial photographs are flown and the film developed in substantially conventional manner for black and white or color films. However, after the negatives are developed, the method of this invention departs radically from what has gone before. In place of preparing prints of the negatives at this time, which are to be assembled into the composite map, the negatives or transparencies are projected between light absorbing diaphragms onto a translucent screen or the like.

The projection of each negative is then aligned with that of adjacent negatives so that the detail thereof blends into the composite mosaic projection. From the screen a single recording or reproduction of the composite reproduction may be taken in any suitable manner. This recording represents the finished map and may be either in natural color or black and white.

Figure 3:
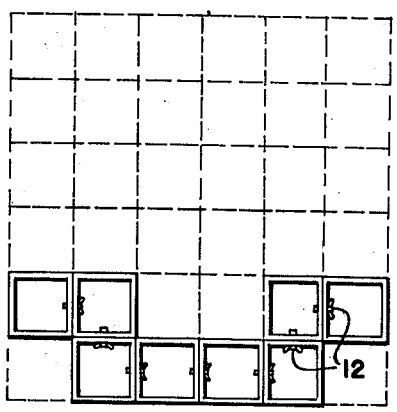
Fig. 3 is an end view of an absorber arrangement schematically showing a modified configuration that the absorber may assume.
Figure 4:
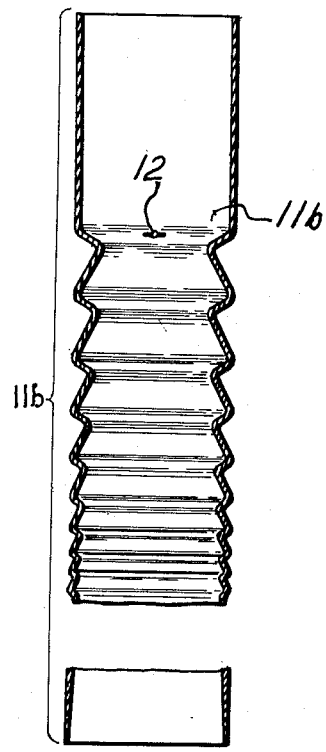
Fig. 4 is a schematic sectional view of a modified absorber member.

Referring to the drawing, the numeral 10 designates a translucent screen, preferably ground glass, mounted at one end of an overlap absorber 11 providing a series of longitudinal ducts with light absorbing wall surfaces which in effect form light-absorbing diaphragms. The overlap absorber preferably comprises a series of elongated duct members 11a in any suitable shape that will match together. These members 11a are fastened together by suitable adjustable fasteners such as wing nuts and bolts 12. The manner of fastening the members together is best shown in Figs. 3 and 4. The overlap absorber may be mounted in any desired configuration as is indicated in Fig. 3. For instance, if a map is being made of a railroad or the like, which continues in a somewhat straight line, a special arrangement of members 11a may be made to conform as nearly as possible with the configuration of the area photographed as shown in full lines in Fig. 3.

At the end of the overlap absorber remote from the screen are slidably positioned projectors housed within casings 13. The mounting of the projectors and the projectors themselves will be hereinafter more fully discussed.

The overall arrangement of screen 10, absorber 11 and projectors 13 is such that a series of elongated ducts are provided intermediate the projectors and screen. The walls of members 11a are surfaced with a suitable light absorbing material and are of relatively thin material. Each member provides a duct which permits the projection therethrough of a beam of light from one of the projectors to make a reproduction or projection upon the screen. The light absorbing surfaces of the duct absorb or blank out the overlap of adjoining or adjacent projections. Thus, the reproduction from each negative on the screen may by adjustment be aligned with that of the adjoining reproductions whereby a composite harmoniously blended map is produced on the screen and may be recorded either by photographing the screen projection or by use of sensitized materials on the screen itself.

In order to more effectively blank out the overlap of the negatives in a manner to substantially reduce the likelihood of reflecting light onto the screen from the walls of members 11a, the members may be formed, at least in part, with corrugated surfaces. The corrugations of the modified duct member 11b, as shown in Fig. 4, are more pronounced adjacent the projectors and adjacent the screen are relatively flat. The walls of members 11b are very thin and at the end adjacent the screen taper into a relatively sharp edge. This is also true of the walls of members 11a. The screen is mounted either in contact with one end of the duct members or may be spaced slightly therefrom, so that no line will appear on the screen between projections.

In aligning the individual projections, the negatives are placed in the projectors according to their proper positions relative to the area photographed. Projector casings 13 are slidably mounted within the individual members 11a of the absorber at the ends remote from the screen. The mounting of the projectors and the projectors themselves must be such that the negatives may be manipulated to move them forward or backward axially of the projector lens, horizontally or vertically of the lens axis, rotated about the lens axis, or tipped or rotated about an axis normal to the lens axis and the entire projector assembly moved backwards and forwards and the lens focused. By manipulating the negatives as indicated above, certain corrections for discrepancies or errors in the negatives due to difficulties encountered in shooting the pictures may be corrected or compensated for. By rotative movement of the negative about the axis of the projector lens the plane of the negative may be oriented with the adjoining negatives. The angle relative to the vertical at which the picture is shot may be compensated for by swinging the negative about an axis transverse to the lens axis.

A suitable means for accomplishing these manipulations is detailed in Figs. 5 and 8 and the showing of the projector in Fig. 1. Referring to Fig. 1 the projector casing 13 has a lens 14 at one end which may be focused by manipulation of rod 41 attached at one end to the lens carrier. The rear end of the rod extends from the rear end face of the projector. At the other end of the projector casing and within the casing is a lamp or light source 15 with a suitable reflector. In the central portion of the casing and transverse of the axis of the lens is positioned the negative carrier 16. This carrier is detailed in Fig. 5 and comprises the central negative holder 17. This holder may comprise the complementary transparent blocks 17a and 17b shown in Fig. 6 preferably of clear glass ground to shape. The negative 18 is sandwiched between these blocks and the unit is placed in the carrier 16. The irregular faces of these blocks impart a predetermined corrective curvature to the negative to compensate for differential shrinkage of negative material and other small inaccuracies occasioned by the curvature of the earth, distance variations in the projected areas at the center and corners of negative, etc. By use of these corrective assemblies, as needed, a map may be made up according to a true scale and representing a true flat projection of the surfaces photographed. The negative holder comprises the central block 17 rotatably mounted in the central opening of apertured plate 19. Plate 19 in turn is mounted within frame 24, the mounting providing for limited horizontal sliding movement of the plate within the frame. Frame 24 is mounted within element 26, the mounting providing for limited vertical movement of the frame within the element.

The sliding movement between plate 19 and frame 24 may be accomplished by providing tongue and groove joints between adjacent horizontal edges of the plate and frame. Similarly tongue and groove joints may be provided between adjacent vertical edges of frame 24 and element 26 to provide for vertical movement of the frame within the element.

To facilitate assembly of the negative holder plate 19, frame 24 and element 26 may be formed in halves which may be assembled by use of rivets and fasteners 19a, 24a and 26a as is clearly illustrated in Fig. 5.

In order to rotate holder 17, pinion gear 20 is mounted on plate 19 and meshes with ring gear 21 mounted on the front face of block 17. Actuating rod 22 is journaled in plate 19 and carries pinion gear 20 at one end. The rod extends rearwardly through the end face of the projector. A knurled knob at the free end of rod 22 facilitates manual or other manipulation of the rod whereby the block 17 may be rotated about the longitudinal axis of the projector. Pinion gear 23 is mounted on the end of rod 27 journaled in frame 24 and meshes with the vertical rack or gear 25 mounted on the adjacent side member of element 26. Rod 27 extends through the rear face of the projector and has a knurled knob at its free end whereby it may be readily rotated to shift frame 24 vertically within side element 26. Pinion 28 is mounted on the end of rod 30 journaled in the lower side member of frame 24 and meshes with the horizontal rack 29 mounted adjacent the lower edge of plate 19. Rod 30 extends through the rear face of the projector and has a knurled knob at its free end whereby it may be manually manipulated. Rotation of rod 30 shifts plate 19 horizontally with end frame 24.

Element 26 has a spherical socket at each corner which is best shown in Fig. 8. The sockets are a part of universal joints and receive balls 31 attached to the ends of rods 32. A removable plate 41 facilitates assembly of the joint. Rods 32 extend rearwardly through the end face of the projector and are provided with knurled knobs at their free ends. Rods 32 are threadedly connected to support frame 33 whereby rotation of the rod advances them axially. Frame 33 may slidably and rotatably receive rods 22, 27 and 30 to lend additional support to the rods intermediate the negative holder and rear face of the projector. Rotation of only one or two of rods 32 will swing the negative about an axis transverse to the longitudinal projector axis.

Figure 9:
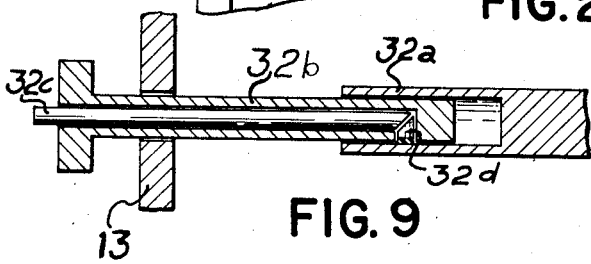
Fig. 9 is an enlarged detail of a portion of one of the rods 32 illustrating a frictional clutch drive.

Rods 32 preferably are formed with a drive clutch as detailed in Fig. 9. The drive clutch comprises the telescoping parts 32a and 32b of the rod, part 32b having an axial passage therein which communicates with a radial passage. The axial passage carries a pin 32c adapted to abut the tapered surface of pin 32d. The latter pin has a friction cushion at its outer end which may be of rubber, felt or other suitable material. The confronting beveled surfaces of the pins provide a cam action for advancing pin 32d radially into contact with the inner wall of rod 32a as desired. Thus the rods 32 may be selectively manipulated without placing the negative carrier 16 in a bind.

Movement of the negative carriers 16 axially of the light ducts 11a may be accomplished by shifting the position of the projectors 13 within the ducts 11a. The lens 14 may then be refocused by manipulating rod 41.

The negative holder substantially fills the projector casing. However, the internal casing walls are light absorbing and light from the lamp which passes between the projector casing and frame is absorbed by the casing walls. Suitable shields of cloth or the like may be secured to the rear sides of element 26 and frame 24 respectively. These shields do not interfere with sliding movement of the plate 19 in frame 24 but do block passage of light between the end spaces which permit sliding movement of the plate and frame respectively.

To facilitate proper alignment of the projections or reproductions on screen 10, in building up the mosaic map, reference points 10a may be located on the screen corresponding to predetermined reference points in the area photographed. Usually several of these points are used for each projection; however, in the interest of simplicity, only a few of these reference points are shown in the drawings. These points may, according to conventional practice, be first surveyed and consist of buildings, roads, fences, hills, or other land marks. It would be preferable to utilize reference points of known location, such as bench marks or the like. This avoids the expense and time involved in making a survey. In addition, finished maps utilizing such reference points may be readily compared with conventional plats which usually show these same marks. Usually these bench marks or the like, due to their smallness or obscurity, are not visible in the photograph. According to this invention, a suitable marker such as a colored balloon, reflector element or the like may be anchored at the reference mark prior to the taking of the photographs in such manner as to be visible from the air when using color films. These elements are visibly recorded on the finished negatives and projections thereof on the screen. In building up the mosaic, the projection reference points are brought into registration with the reference points first located on the screen. This facilitates the alignment of the projections on the screen to a predetermined scale.

In natural color maps it is desirable that the component parts of the map have uniform color characteristics. However, the color characteristics of the individual negatives are dependent to a considerable degree on certain variables such as, for instance, the time of day, light intensity, haze, and the like. It has been found that these variations may be substantially compensated for by the use of suitable color filters and control of color temperature of light source in conjunction with the projectors to produce a composite map having uniform color characteristics.

Figure 2:
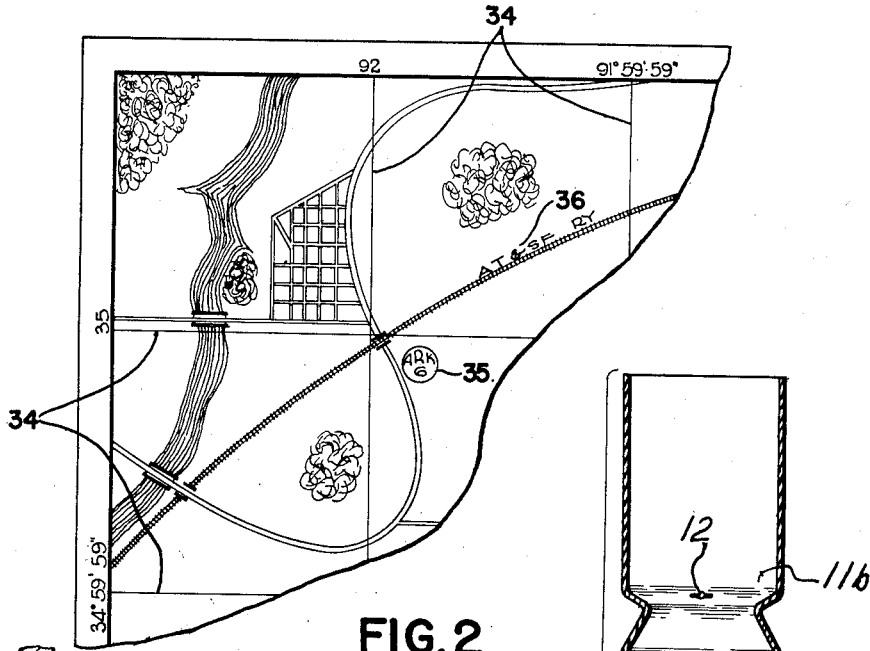
Fig. 2 is a fragmentary plan view of a map made according to this invention.

It is often desirable that the finished maps have reference indicia imposed thereon such as longitude and latitude reference lines, highway markers, names of railroads, river, cities or the like. This is illustrated in the fragmentary replica of a map shown in Fig. 2 wherein longitude and latitude reference lines 34 are imposed on the face of the map as well as the highway markers 35 and the abbreviated name 36 of the railroad. The reference indicia may be imposed upon the map in any suitable way and by way of illustration, it is suggested that the indicia may be placed on the screen 10 as desired before the recording of the projection is made.

The overlap absorber 11 is shown having 16 ducts. It is to be understood that any number of projectors may be built up into a battery in which case the overlap absorber must have sufficient ducts to provide a separate duct for each projector. It is contemplated that as many as 300 or even more projectors may be used in a single battery.

It is contemplated that remote control connections may be used in conjunction with control rods 22, 27, 30, 32 and 41 whereby a single operator may stand in a position to view the screen and control the positioning of the negatives in the individual projectors. These connections may be of any suitable type such as flexible connections used in automobile speedometers and the like. The free ends of the connectors may be suitably mounted in a panel 37 as diagrammatically shown in Fig. 7. The panel may have suitable indicia imposed thereon to designate the various projectors. Knobs 38 at the ends of the connections are mounted on one side of the panel to provide for manual manipulation of the flexible connections.

In operation, after the aerial photographs have been taken and developed, the negatives are placed within the central negative holders 17 of the projectors 13 in their proper positions relative to the area photographed. The correcting elements 17a and 17b may be used to obtain a corrected projection on the screen 10. Proper alignment of the projections relative to one another is accomplished by manual manipulation of the projectors or negative holder frames 19 severally. By reference to Figs. 1 and 5 it will be seen that vertical shifting of the negative is obtained by rotation of rod 27. This movement is accomplished through gears 23 and 26. Horizontal movement of the negative is similarly obtained by rotating rod 30 which actuates pinion gear 28 and rack 29. Rotative movement of the negative relative to the longitudinal axis of the projectors or the lens axis is accomplished by rotation of rod 22 to actuate gears 20 and 21. Rods 32 are threaded to support frame 33 and when rotated serve to swing the negative about an axis transverse to the longitudinal axis of the projector. Axial movement may be accomplished by physical axial shifting of the projector within its individual duct member 11a.

If reference points 10a are to be used in compiling the map, they are first located in the proper predetermined positions on screen 10 and corresponding points of the projections are brought into registration with the points 10a. Any detail or indicia other than that of the composite negatives, which is desired on the finished map, may be imposed on the screen before the recording thereof, upon the recording, or upon the negative as desired.

After the projections are brought into proper alignment and the colors, if any, harmonized, the composite map or projection on the screen may be photographed or otherwise recorded such as by the use of a sheet of sensitized material placed on the screen as will be understood by those skilled in the art.

If screen 10 is spaced slightly from the end of absorber 11, there will be no division lines upon the composite projection because of the ends of the walls of members 11a. However, the cross sectional area of each duct may be so selected as to represent the area unit of the desired scale of the finished product. If this is desired, then screen 10 is mounted flush with the ends of units 11a or so close thereto as to leave narrow reference lines on the screen as shown in Fig. 1.

It is obvious that either color or black and white film may be used in taking the pictures and that the recording from the composite map or projection on screen 10 may in the first instance be either in color or in black and white. Although a plurality of negatives are used to build up the projection on the screen, nevertheless, the print or recording of the composite mosaic map requires only a single print. Copies, of course, may be duplicated in any known manner as is well understood by those skilled in the art. Thus, the time and expense inherent to making prints of a plurality of negatives is entirely eliminated and the expense of the one color print, which will be required in operating under this invention, becomes negligible. This is of particular importance where a finished map in natural color is desired. The heretofore tedious time consuming job of assembling the mosaic has been completely eliminated. By this invention natural color mosaic maps are for the first time made available. For most purposes the finished map in natural color is desirable as more information may be derived therefrom.

The following advantages, among others, are inherent to the map of this invention. A true scale map in color makes possible the accurate determination of location and area of a certain crop or field and aids in the determination of the identity of the particular crop. The contours of the outcroppings of the earth's formations may be more readily followed or identified from a color map. The depth of a given portion of a body of water may be accurately estimated from the variations in color intensity throughout the area photographed or reproduced. These examples of the use and benefits of the true scale color maps of this invention are given by way of illustration and not by way of limitation.

It will be seen that the objects of this invention have been accomplished. There has been provided a method and apparatus for preparing an aerial mosaic map which may be assembled according to a true scale and may be either in natural color or black and white. The arrangement is such that the individual reproductions or projections may be readily aligned relative to the points of the compass and to each other making corrections for elevational differences from which the individual negatives were taken or other discrepancies. The construction is such that the overlap of adjacent or adjoining negatives is absorbed by an absorbing shield or partition facilitating alignment of the individual negatives upon the screen.

From the foregoing it will be seen that this invention is one well adapted to attain all of the ends and objects hereinabove set forth together with other advantages which are obvious and which are inherent to the apparatus and process as well as the map.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having described my invention, I claim:

1. In the production of photographic mosaic maps, the process which comprises taking series of individual aerial photographs of the area to be mapped while taking each photograph as closely as possible along an exactly vertical line, from a predetermined height and with substantial overlaps between adjacent exposures, preparing transparencies from the photographs, projecting said transparencies in their proper relative positions through an assembly of juxtaposed elongated substantially parallel ducts occupying the entire projection area and having light-absorbing walls all of which are parallel to the axes of said ducts and spaced parallel, receiving the projections on a screen adjacent the far end of said ducts, adjusting the lengths of the projections through said ducts and manipulating the relative positions of the projected transparencies with respect to each other and to the screen until the overlapping portions thereof are absorbed on said light-absorbing walls and a true mosaic map of the area photographed is reproduced on said screen.

2. The process of claim 1 followed by making a photographic reproduction of the projected mosaic.

3. The process of claim 1 wherein said transparencies are color transparencies and a reproduction of the projected mosaic is made in color.

4. The process of claim 1 wherein the transparencies are rotated with respect to the axes of the projections in order to align adjoining projections relative to the points of the compass.

5. The process of claim 1 wherein the transparencies are rotated with respect to axes which are perpendicular to the axes of the projections in order to align adjoining projections and to compensate for exposures taken in lines inclined to the vertical.

6. The process of claim 1 wherein the distances of the transparencies with respect to the screen are adjusted in order to compensate for any differences in the elevations from which the individual exposures were made.

7. The process of claim 1 wherein the projected transparencies are color transparencies and including the steps of controlling the temperatures of the projecting lamps and introducing color filters in the projecting system where necessary in order to produce a mosaic projection having uniform color characteristics.

8. In the production of photographic mosaic maps, the process which comprises locating a plurality of known reference points in the area to be reproduced on a screen in accordance with a predetermined scale, taking series of individual aerial photographs of the area including said reference points while taking each photograph as closely as possible along an exactly vertical line from a predetermined height and with a substantial overlap between exposures, preparing transparencies from the photographs, projecting said transparencies on said screen in their proper relative positions through an assembly of juxtaposed elongated substantially parallel ducts occupying the entire projection area and having light-absorbing walls, all of which are parallel to the axes of the ducts and spaced parallel adjusting the positions of the projected transparencies which include said reference points to make the projections coincide with the corresponding points located on said screen, adjusting the lengths of the projections through said ducts and manipulating the relative positions of the projected transparencies with respect to each other and to the screen until the overlapping portions thereof are absorbed on said light-absorbing walls and a true mosaic of the area photographed is reproduced on said screen.

9. In the production of photographic mosaic maps, the process which comprises taking series of individual aerial photographs of the area to be mapped while taking each photograph as closely as possible along an exactly vertical line, from a predetermined height and with substantial overlaps between adjacent exposures, preparing transparencies from the photographs, projecting said transparencies in their proper relative positions with the projection axes substantially parallel between light-absorbing diaphragms adapted to absorb the overlaps between the projections, all of said diaphragms being substantially parallel to the projection axes and spaced parallel, receiving the projections on a projecting screen, adjusting the lengths of the projection paths and manipulating the relative positions of the projected transparencies with respect to each other, to the diaphragms and to the screen until the overlapping portions thereof are absorbed on said light-absorbing diaphragms and a true mosaic of the area photographed is reproduced on said screen, then reproducing the projected mosaic.

10. In the production of colored photographic mosaic maps, the process which comprises taking series of individual aerial colored photographs of the area to be mapped while taking each photograph as closely as possible along an exactly vertical line, from a predetermined height and with substantial overlaps between adjacent exposures, preparing color transparencies from the exposed film, simultaneously projecting said transparencies in their proper relative positions with the projection axes substantially parallel through an assembly of juxtaposed elongated substantially parallel ducts occupying the entire projection area and having light-absorbing walls, all of which are parallel to the axes of said ducts and spaced parallel receiving the projections on a translucent screen adjacent the far end of said ducts, adjusting the lengths of the projections through said ducts and manipulating the relative positions of the projected transparencies with respect to each other and to the screen until the overlapping portions thereof are absorbed on said light-absorbing walls and a true mosaic map of the area photographed is reproduced on said screen, adjusting the temperatures of the individual sources of light for the projectors and introducing color filters where necessary to compensate for color differences between individual projections, then taking a color photograph of the projected mosaic.

11. An apparatus for projecting a true mosaic map from transparencies made from series of individual aerial photographs of the area to be mapped taken as closely as possible along an exactly vertical line and from a predetermined height with substantial overlaps between adjacent exposures, which comprises in combination a bank of projectors arranged with their projection axes substantially parallel, a projecting screen in position to receive the projections, a plurality of light-absorbing diaphragms arranged between said projectors and said projecting screen all of which are substantially parallel with the projection axes and spaced parallel and adapted to eliminate the overlaps between adjacent projections, transparency holders mounted in the projection paths of said projectors, means for independently changing the lengths of the projection paths, and means for individually rotating and adjusting the transparency holders with respect to said diaphragms and the screen to eliminate the overlaps between adjacent projections, whereby a true mosaic map of the area photographed can be projected on said screen.

12. A projecting apparatus capable of forming a projected true mosaic map from transparencies made from series of individual aerial photographs of the area to be mapped taken as closely as possible along an exactly vertical line and from a predetermined height with substantial overlaps between adjacent exposures, which comprises in combination a bank of transparency projectors, a corresponding assembly of juxtaposed elongated substantially parallel ducts occupying the entire projection area and provided with light-absorbing walls, all of which are parallel to the axes of said ducts and spaced parallel a screen placed in front of and adjacent said duct assembly, said projectors being aligned with said ducts to project said transparencies therethrough on said screen, means for adjusting said projectors axially of said ducts and means for individually manipulating the positions of the transparencies with respect to each other and to the screen whereby the overlaps between adjacent projections can be eliminated and a true projected mosaic map obtained on said screen.

13. The apparatus of claim 10 wherein said manipulating means comprises means for rotating said transparencies with respect to their axes of projection.

14. The apparatus of claim 10 wherein said manipulating means comprises means for rotating said transparencies with respect to axes perpendicular to the axes of projection.

15. The apparatus of claim 10 wherein said manipulating means comprises means for moving said transparencies toward and away from said screen.

16. An apparatus for projecting a true mosaic map from transparencies made from series of individual aerial photographs of the area to be mapped taken as closely as possible along an exactly vertical line and from a predetermined height with substantial overlaps between adjacent exposures, which comprises in combination an assembly of juxtaposed elongated ducts occupying the entire projection area and having light-absorbing walls all of which are parallel with the axes of the ducts and spaced-parallel, a corresponding bank of transparency projectors mounted to slide longitudinally in said ducts and adapted to project transparencies therethrough, transparency holders mounted to move with said projectors, a projecting screen mounted in front of and adjacent to said ducts, means for rotating the transparency holders about the projection axes, means for rotating said holders about axes perpendicular to the projection axes and means for moving the transparency holders toward and away from the screen independently of the projectors, whereby a true mosaic map of said transparencies can be projected on said screen oriented with respect to points of the compass and with their overlaps absorbed on the light-absorbing walls of said ducts.

17. In the production of photographic mosaic maps, the process which comprises taking a series of parallel lines of pictures from a plane while taking each photograph as closely as possible along a vertical line and from a predetermined height, the said pictures overlapping along the lines and between adjacent lines, projecting the resulting negatives on a screen with each projection in its proper relative position while passing the projecting beams through an assembly of juxtaposed elongated substantially parallel ducts occupying the entire projection area and having light-absorbing walls all of which are parallel to the axes of said ducts and spaced parallel, adjusting the lengths of the projections through said ducts and manipulating the relative positions of the projected negatives with respect to each other and to the screen until the overlapping portions of the projected areas are absorbed on said light-absorbing walls and a true mosaic map of the area photographed is reproduced on said screen, then making a print of the projected mosaic as a whole.

HARRY PENNINGTON, Jr.

REFERENCES CITED

The following references are of record in the file of this patent:

UNITED STATES PATENTS

| Number | Name | Date |
|---|---|---|
| 1,082,678 | Casler | Dec. 30, 1913 |
| 1,208,462 | Boerstein | Dec. 12, 1916 |
| 1,421,523 | Mechau | July 4, 1922 |
| 1,654,070 | Corlett et al. | Dec. 27, 1927 |
| 1,699,136 | Eliel | Jan. 15, 1929 |
| 1,735,109 | Eliel | Nov. 12, 1929 |
| 1,739,816 | Barton | Dec. 17, 1929 |
| 1,808,352 | Hollen | June 2, 1931 |
| 1,911,142 | Cahill | May 23, 1933 |
| 1,933,783 | Wittel | Nov. 7, 1933 |
| 1,937,711 | Nelles et al. | Dec. 5, 1933 |
| 1,940,004 | Mayhugh | Dec. 19, 1933 |
| 1,945,926 | Tolhurst | Feb. 6, 1934 |
| 1,980,657 | Bauersfeld | Nov. 13, 1934 |
| 2,102,161 | Newman | Dec. 14, 1937 |
| 2,200,594 | Diggins et al. | May 14, 1940 |
| 2,431,847 | Van Dusen | Dec. 2, 1947 |

FOREIGN PATENTS

| Number | Country | Date |
|---|---|---|
| 280,237 | Great Britain | Apr. 8, 1928 |
| 299,734 | Great Britain | Oct. 29, 1928 |